United States Patent
McNeely et al.

(10) Patent No.: US 7,141,136 B2
(45) Date of Patent: Nov. 28, 2006

(54) METHOD AND APPARATUS FOR APPLYING A FILM ADHESIVE TO A PERFORATED PANEL

(75) Inventors: John L. McNeely, Montgomery, AL (US); Ray Funderburke, Tallassee, AL (US); Shannon Hogg, Tallassee, AL (US)

(73) Assignee: GKN Westland Aerospace, Inc., Tallassee, AL (US)

( * ) Notice: Subject to any disclaimer, the term of this patent is extended or adjusted under 35 U.S.C. 154(b) by 198 days.

(21) Appl. No.: 10/812,585

(22) Filed: Mar. 29, 2004

(65) Prior Publication Data

US 2004/0177920 A1    Sep. 16, 2004

Related U.S. Application Data

(62) Division of application No. 10/255,910, filed on Sep. 26, 2002, now Pat. No. 6,736,181.

(51) Int. Cl.
*B32B 38/04* (2006.01)

(52) U.S. Cl. .................. 156/252; 156/253; 156/270; 156/285; 83/30; 83/53; 83/177

(58) Field of Classification Search .................. None
See application file for complete search history.

(56) References Cited

U.S. PATENT DOCUMENTS

| | | | | |
|---|---|---|---|---|
| 4,155,800 A | * | 5/1979 | Wilson | 156/497 |
| 4,990,201 A | * | 2/1991 | Trnka | 156/85 |
| 5,938,875 A | * | 8/1999 | Jessup et al. | 156/79 |
| 6,500,516 B1 | * | 12/2002 | Bourlier et al. | 428/116 |

* cited by examiner

*Primary Examiner*—Jessica Rossi
(74) *Attorney, Agent, or Firm*—Raggio & Dinnin, P.C.

(57) ABSTRACT

A method and apparatus for preparing a perforated panel for reticulation to a film adhesive. The method includes supporting the perforated panel. The method also includes adhering the film adhesive to the perforated panel without initiating a cure of the film adhesive. The method applies a vacuum to the film adhesive. Next the method will move the perforated panel at a predetermined speed through a reticulation unit. Next the method will soften the film adhesive and finally remove the film adhesive from the perforations by an airflow. The method is generally used for creating acoustic sheet panels for use in many industries.

12 Claims, 5 Drawing Sheets

METHOD AND APPARATUS FOR APPLYING A FILM ADHESIVE TO A PERFORATED PANEL

This is a divisional of application Ser. No. 10/255,910, filed Sep. 26, 2002, now U.S. Pat. No. 6,736,181.

BACKGROUND OF THE INVENTION

1. Field of the Invention

The present invention generally relates to applying an adhesive to a panel, and more particularly, relates to applying a film adhesive to an acoustic face sheet for use in the aerospace industry.

2. Description of Related Art

Methods for applying an adhesive to a core of an acoustic face sheet for use in aerospace or other industries, that require sound dampening, have been known for many years. These prior art core reticulation systems, as they are known, have the film adhesive directly reticulated onto the core of the acoustic panels. After reticulation the core is connected to a surface of the acoustic panel and aligned such that the holes or perforations of the acoustic panel align with the holes of the core. The core reticulation system generally has the film adhesive softened and maintained at the softened state on the core by radiant heaters. After the film adhesive is softened on the core it is passed over an air knife in order to remove the film adhesive from the holes of the core material.

Generally, the core has a honeycomb type shape and it is desired to have the adhesive only on the top portions of the core itself and not within the orifices of the honeycomb core. In the prior art system of reticulation the core, after having the film adhesive softened, will pass through a reticulator on a wire rack that slides on rails within the reticulator. Then an air knife will direct compressed air from underneath the core and at a distance of approximately one foot away from the core. This will allow for the adhesive to be blown from around the top of each cell of the honeycomb cell structure thus in theory leaving the cell passages clear and adhesive free. The end product of the prior art core reticulation system is a core that would include film adhesive around the edge of the core cells. However, many of the prior art systems, due to the size difference of the core cells and ply holes, would have the ply holes blocked during bonding which also would lead to adhesive run off which clogs even more of the perforations in the acoustic panels. The acoustic panels generally work by absorbing sound within the perforations or orifices of the acoustic face sheet. If any of these holes are blocked or the adhesive runs off, which can cause blockage in even more holes, then the acoustic absorption ability of the acoustic face sheet is sharply reduced.

The prior art method of core reticulation encounters numerous problems during the reticulation of the core. First, the air knife used to cut or remove the skin adhesive from the core is driven by compressed air that generally includes contaminants that mix with and degrade the adhesive that is left on the ends of the core cells of the core reticulation system. These contaminants will reduce the adhesive force between the core and outer panels or skins of an acoustic face sheet. Any separation of the outer panel of the acoustic member from the core will degrade the noise absorption characteristics of the panel, reduce structural integrity and also create extraneous noise due to any vibration between the loosely connected core and outer panels. Another problem associated with the prior art core reticulation method is that the air surrounding the film adhesive is capable of cooling which leads to tears in the film adhesive on the edge of the core cells. These tears will reduce the effectiveness of the film adhesive, when the film adhesive is aligned with and secured to the panel. Furthermore, if the air cools enough and the air knife is not run at an appropriate pressure the film adhesive will not be removed from over the opening of the cell in the honeycomb core structure thus blocking the acoustic absorption for that cell and reducing the overall effectiveness of the acoustic absorption of the acoustic sheet. The prior art core reticulation method also has problems developing and having uniform fillets along the edge of the honeycomb cells. Furthermore, if the wrong angle is used for the air knife, with relation to the core, a venturi can develop within each individual cell and the fillet would not be properly formed on top of the cell thus causing a reduction in the acoustic absorption capability of any such damaged cell.

The prior art core reticulation method also generally leaves defects within the core reticulation system of greater then twenty percent. Manufacturers want the acoustic sheet panels to be less then ten percent degraded due to unopened or blocked core cells in the honeycomb core of an acoustic sheet. The noise attenuation of the acoustic face sheets is paramount in the design of modem day aerospace vehicles. The more blocked cells in the honeycomb core the less the noise absorption potential for the acoustic panel. These acoustic panels line cockpits, bodies, wings and even containment walls inside an engine, thus reduction of noise is key to the effectiveness of such products.

Therefore, there is a need in the art for a new reticulation method that will directly adhere the film adhesive to the panel instead of the edge of the honeycomb core. There is also a need in the art for a reticulation method that will reduce the amount of contamination and partially block or blocked cells in the acoustic face sheet core cells. Furthermore, there is a need in the art for a low cost method for manufacturing and building acoustic face sheet panels.

SUMMARY OF THE INVENTION

One object of the present invention is to provide an improved method of reticulation.

Another object of the present invention is to provide a new method and apparatus for panel and film adhesive reticulation.

Yet a further object of the present invention is to provide a method of panel reticulation that will maintain a constant temperature and promote softening of a film adhesive before passing over an air flow.

Still a further object of the present invention is to provide a method of creating panel and film adhesive reticulation on a variety of contoured parts.

Still another object of the present invention is to provide a method of panel reticulation that reduces the contamination of the film adhesive and any tearing of the film adhesive.

Still a further object of the present invention is to provide a method of panel and film adhesive reticulation without any orifice blockages between the core and holes in the perforated panel.

To achieve the fore going objects, a method for panel and film adhesive reticulation includes the steps of supporting the panel with a contoured surface. The method also includes applying an amount of pressure to the film adhesive and panel by a vacuum mechanism. The method also includes heating the film adhesive with a low grade heat until initial adhesion of the film adhesive to the panel without curing of the film adhesive. Next the method will move the panel, with initial film adhesion, through a reticulation unit which includes a contoured head and a shroud. The panel will be in contact with the contoured head. The method also includes softening the film adhesive with heat such that the heat is contained within the shroud. The reticulation method will then dry, filter and heat an air flow prior to entering a nozzle located within the contoured head. The method will then move the film adhesive from the perforations of the panel with a predetermined rate of air flow.

One advantage of the present invention is that the method of panel and film adhesive reticulation connects the film adhesive directly to the panel and not the core.

A further advantage of the present invention is that the film adhesive is softened and maintained in such a state before passing over an air flow.

Another advantage of the present invention is that the panel and film adhesive reticulation apparatus includes a shroud which provides a more stable environment than radiant heaters during the reticulation process.

Still a further advantage of the present invention is that the perforated panel is moved over a contour surface plate that can be changed to accommodate part shape.

Still another advantage of the present invention is that the airflow is cleaned, dried and heated prior to being used to remove film adhesive.

Still another advantage of the present invention is that the airflow is directed onto the panel at close proximity.

Still a further advantage of the present invention is that the airflow will not produce turbulence because of the close proximity of the airflow to the panel.

Still another advantage of the present invention is that the airflow will have no cooling affect on the film adhesive.

Still another advantage of the present invention is the reduction in cost and manufacturing time of an acoustic face sheet.

Still another advantage of the present invention is that an acoustic face sheet that has a significant improvement in acoustic performance, i.e. sound absorption and sound dampening.

Other objects, features and advantages of the present invention will become apparent from the subsequent description and the appended claims, taken in conjunction with the accompanying drawings.

DESCRIPTION OF THE EMBODIMENT(S)

Figure 1:
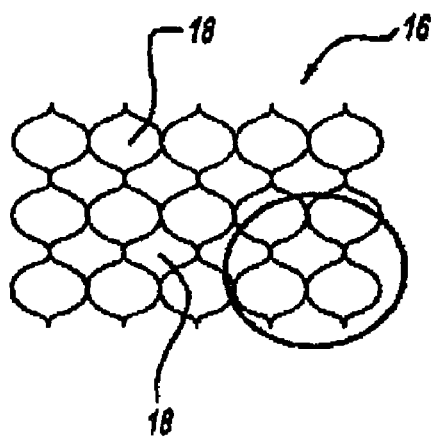
FIG. 1 shows a top view of a prior art honeycomb core.

Referring to the drawings, a method and apparatus for panel and film adhesive reticulation according to the present invention is shown. The panel and film adhesive reticulation method and apparatus is generally used to manufacture acoustic aerospace face sheets or panels for uses in aerospace vehicles. The use in such aerospace vehicles could be anything from containment walls for engines to skins for the body and wings of such vehicles. The acoustic face sheet generally is made of graphite or fiberglass, however it should be noted that other materials could also be used such as composite materials, plastics, or metals depending on the design and weight requirements of the aircraft. The key to acoustic face panels is the noise attenuation. The panels have a honeycomb core cell that is used to dampen noise and/or absorb acoustic waves. The panels will help to dampen any noise being heard by passengers and pilots of airplanes or other aerospace vehicles. If the core cells in the acoustic panel are blocked or partially blocked by film adhesive or contaminants connected to film adhesive then the noise absorption capability and noise dampening capability of the acoustic panels will be greatly reduced thus, creating more extraneous noise for the operator or passengers of airplanes and the like.

The present invention will allow for reticulating a film adhesive 14 onto a perforated panel 10 which will yield an end product which has film adhesive 14 covering the panel surfaces without covering, partially or completely, the perforation or orifices 12 in the perforated panel 10. This will allow for the orifices 12 of the perforated panel 10 to align precisely with the cells in the honeycomb core thus providing the acoustic absorption and sound dampening capabilities for the acoustic panels. The end product of an acoustic panel includes a solid panel on one side thereof with the honeycomb core glued to that surface and then the perforated panel 10, having the film adhesive reticulation method performed on it, secured to the opposite end of the honeycomb core cell via a curing of the film adhesive between the core and panel 10. When installed in an engine containment wall or a skin of an airplane, the perforated panel 10 will have the orifices 12 placed towards the inside components of the engine such as the fan or turbine blades to effect the sound absorption capabilities of the perforated acoustic panel system.

Figure 2:
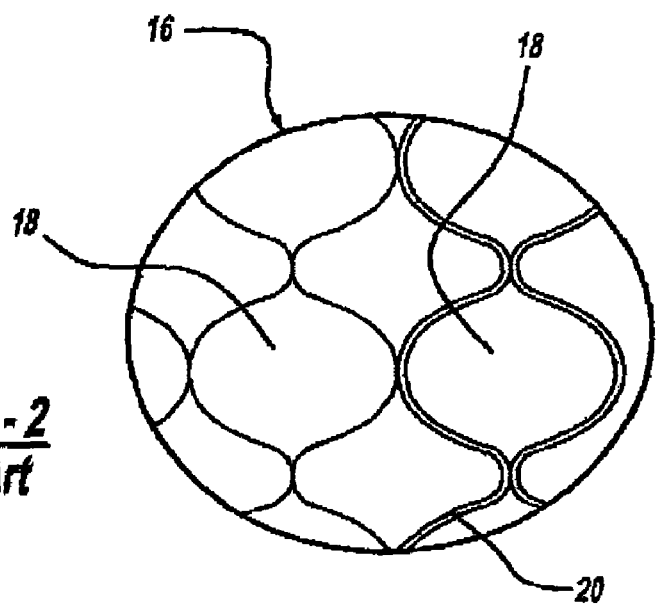
FIG. 2 shows a close up of the prior art honeycomb core cells with adhesive and without film adhesive thereon.
Figure 3:
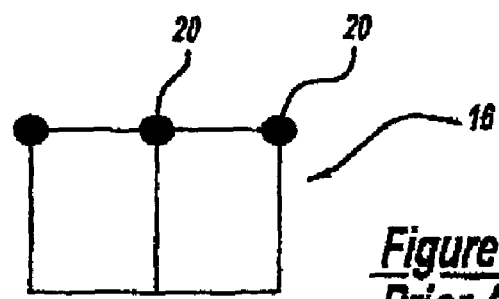
FIG. 3 shows a side view of prior art honeycomb core cells with a film adhesive fillet at the top end thereof.

FIGS. 1 through 3 show a prior art method of core reticulation. Core reticulation occurs on a honeycomb core 16 that includes a plurality of cells 18 therein. The honeycomb core 16 is then placed between a ply and a solid panel on the opposite end to form an acoustic face sheet. Core reticulation has the film adhesive 20 reticulated directly on to the core 16 edge. The film adhesive 20 is softened and maintained at a soft state on the core 16 by radiant heaters. The core 16 is then passed through a unit on a wire rack which slides on rails over an air knife which is used to remove the film adhesive 20 from the cells 16 such that it only rests and is fixed on the outer edges of the core cells 18. In the prior art systems the air knife directs compressed air from beneath the core 16 at approximately one foot in distance. This air knife will blow air through the adhesive and in theory leave the adhesive only located around the top of each cell, with the cell passages free from and clear from film adhesive 20. However, in practice this does not always occur. The film adhesive 20 is supposed to only adhere around the edge of the core cells 18. However, in the prior art method due to the size difference of core cells 18 and ply holes many of the ply holes are blocked during bonding.

Furthermore, with the film adhesive 20 attached to the edge of the core cells 18 adhesive run off is more likely thus increasing the chance of clogging a cell 18 with the adhesive prior to and after being secured to the ply panel. FIG. 3 shows a side view of the prior art core cells and the film adhesive 20 having a fillet located at the top edge of each core cell 18 after the reticulation process has been applied. FIG. 2 shows a close up of the honeycomb core cell 16 with one side having the film adhesive 20 reticulated thereon and the other side having no adhesive thereon.

FIGS. 4 through 9 show the apparatus and method for panel and film adhesive reticulation according to the present invention. The method will allow a panel 10 to be reticulated for bonding with a film adhesive 14. The apparatus needed to perform the panel and film adhesive reticulation according to the present invention includes an adhesion unit 22 and a reticulation unit 24.

Figure 6:
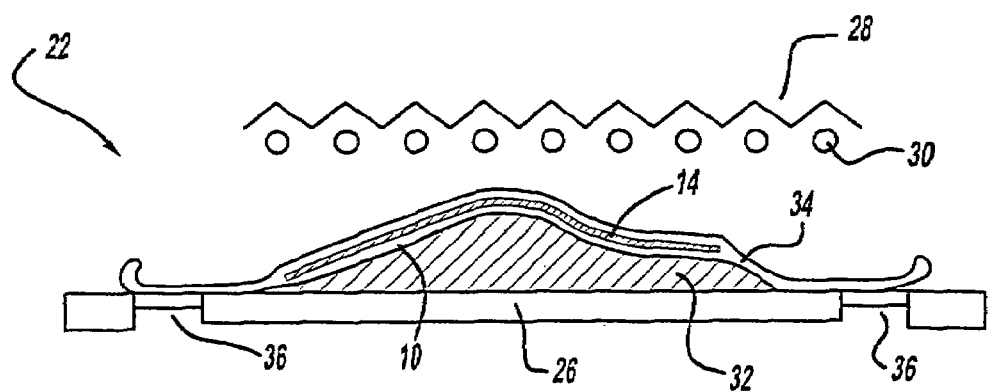
FIG. 6 shows a schematic view of the adhesion unit according to the present invention.
Figure 5:
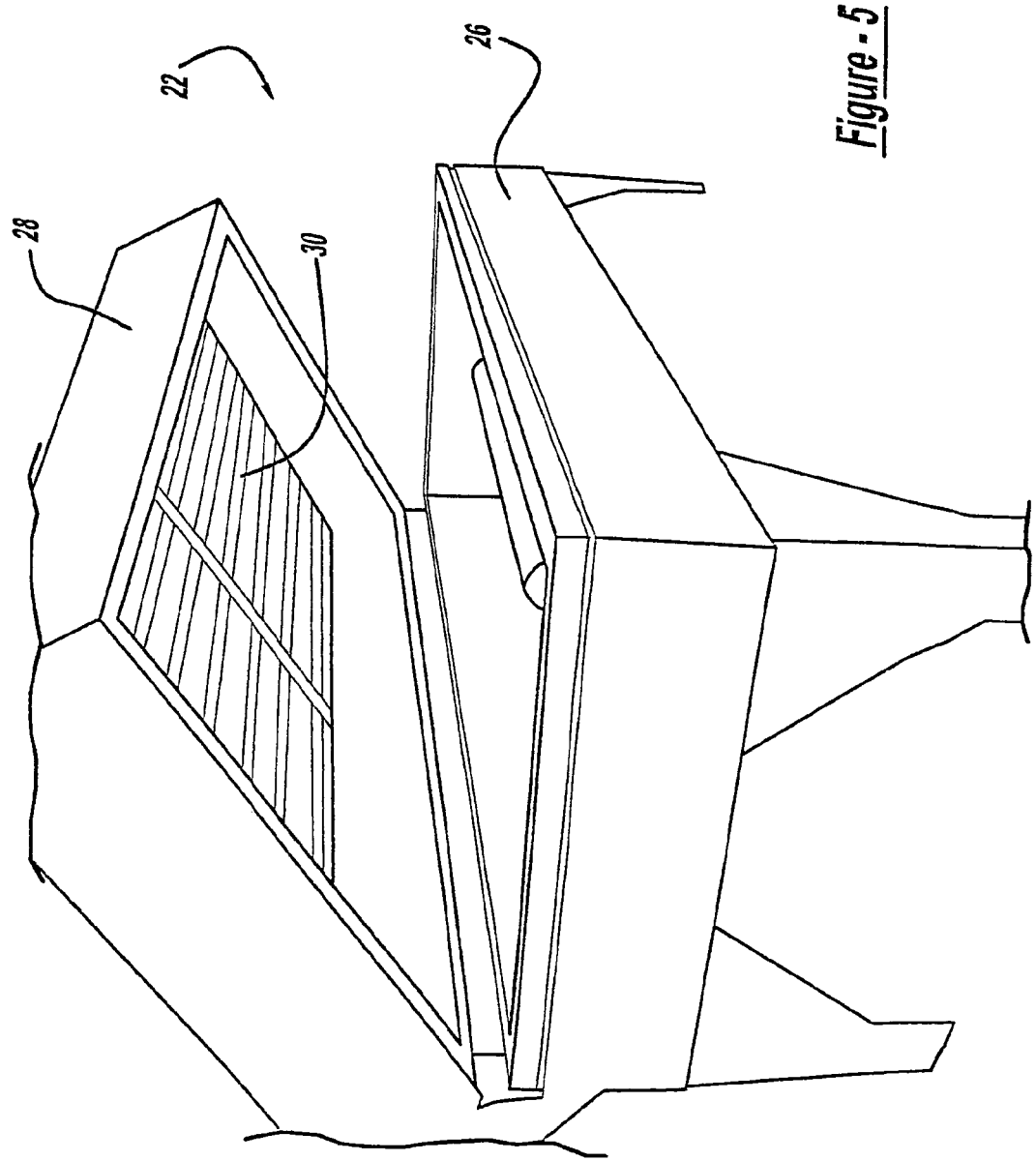
FIG. 5 shows a perspective view of the adhesion unit according to the present invention.

The adhesion unit 22 as shown in FIGS. 5 and 6 includes a table or base 26 and a cover 28. The cover 28 is rotatable about an axis on one side of the table 26 such that the cover 28 opens and closes relative to the table 26. The cover 28 has a radiant heat source 30 located on an inside surface thereof. In one embodiment the radiant heat source 30 is a plurality of electric bulbs. The electric bulbs will give off a predetermined amount of heat, in one embodiment approximately 120° Fahrenheit of low grade heat is necessary. However, it should be noted that any where between a range of 70° to 220° Fahrenheit heat may be used for the adhesion unit 22. It should also be noted that other radiant heat sources can also be used such as heated air, thermal blankets, etc. The temperature and dwell times used in this operation will need to be customized for different film adhesive systems. Acoustic systems, outside the scope of the aerospace industry, may require very different parameters. Therefore, the apparatus and equipment of the present invention has variable controls to accommodate such changes. These other heat sources can be used depending if they are appropriate for the part configuration or the variables of the film adhesive system used in the present invention. Thus, the heat source 30 of the adhesion unit 22 radiates heat down towards the perforated panel 10 which is supported on the table 26 of the adhesion unit 22. The perforated panel 10 is supported by a contoured surface or mandrel 32 that mimics the shape of the panel 10 which will be used in the aerospace vehicle. The use of the contoured mandrel 32 will allow for the perforated panel 10 to have complete support during the adhesion unit operation thus preventing any distortion through the initial adhesion process of the panel and film adhesive reticulation method.

The adhesion unit 22 also includes a vacuum system through a surface of the table 26. The adhesion unit 22 includes a vacuum bag 34 that is connected at one side of the table 26 and is capable of being lifted up from the other side of the table 26. In one embodiment the vacuum bag 34 will be a rubber pad but other materials may be used for the vacuum bag such as but not limited to plastic, composites, metal, etc. The vacuum that is applied to the table 26 is created by at least one orifice 36 through the table 26 thus allowing for the vacuum bag 34 to be compressed towards the surface of the table 26 after the vacuum is applied through the orifice 36. The vacuum bag 34 will allow for a mild pressure i.e. approximately 10 to 20 psi, to be applied to the film adhesive 14 and perforated panel 10 during the adhesion unit stage of the method. It should be noted that the pressure is a mild pressure and that too low or too high of a pressure will adversely affect the initial adhesion of the film adhesive 14 to the perforated panel 10. It should be noted that the adhesion unit 22 is used to create a level of adhesion between the perforated panel 10 and the film adhesive 14 without initiating a cure of the film adhesive 14. It should also be noted that variables within the adhesion unit 22 are capable of adjustment thus providing for different adhesive configurations. A variety of panel configurations can also be accommodated by switching the contoured surface mandrel 32 to one that matches a new part being reticulated.

As shown in FIG. 6 the contoured mandrel 32 is placed directly on the outer surface of the table 26. Then a perforated panel 10 is placed directly over the contoured mandrel 32. The mandrel 32 will mimic the exact shape of the perforated panel 10 thus providing support throughout the entire adhesion unit process. Next a film adhesive 14 layer is placed directly on top of the perforated panel 10. It should be noted that the perforated panel 10 includes a plurality of orifices 12 therethough. There the vacuum bag 34 is placed over the film adhesive 14 and a vacuum is applied via the table 26 such that the vacuum bag 34 is compressed downward towards the table 26 thus compressing the film adhesive 14 into the perforated panel 10 with a mild pressure. The cover 28 of the table is then closed and the radiant heat source 30 is turned on such that heat and mild pressure are applied to the film adhesive 14 and perforated panel 10. The heat and pressure are left on for approximately 30 (thirty) seconds, that will allow for an initial adhesion between the film adhesive 14 and perforated panel 10 without initiating a cure of the film adhesive 14. This dwell time will vary with different film adhesive systems. Generally, the film adhesive 14 will begin to display bubbles throughout when an initial adhesion has been reached. It should be noted that 30 seconds is an approximate time for the adhesion unit step of the panel reticulation method. It should be noted that anywhere from a few seconds up to a number of minutes could be used for the initial adhesion between the film adhesive 14 and the perforated panel 10.

Figure 4:
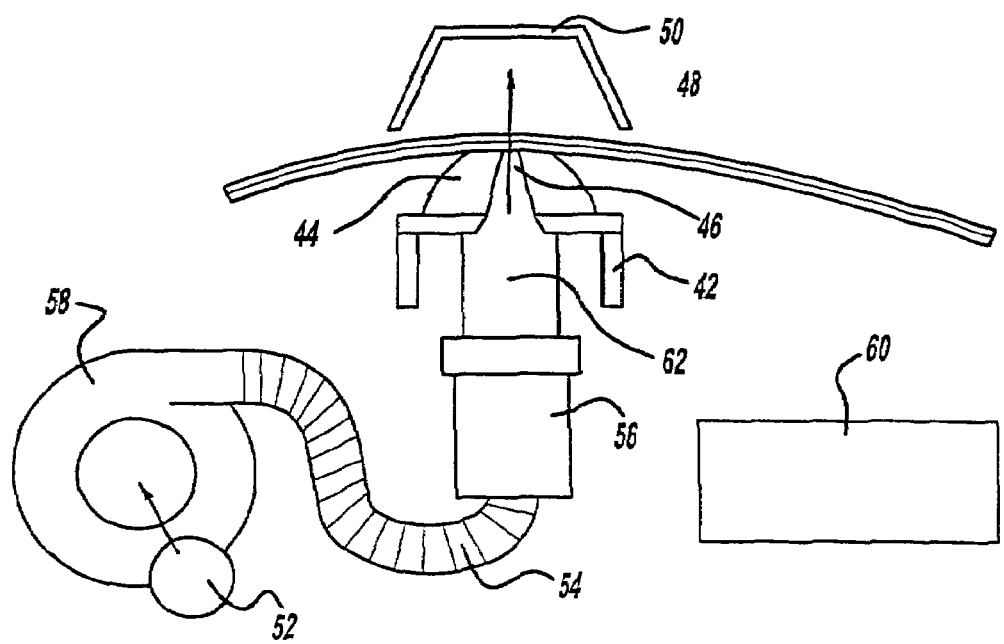
FIG. 4 shows a schematic of the reticulation unit according to the present invention.
Figure 7:
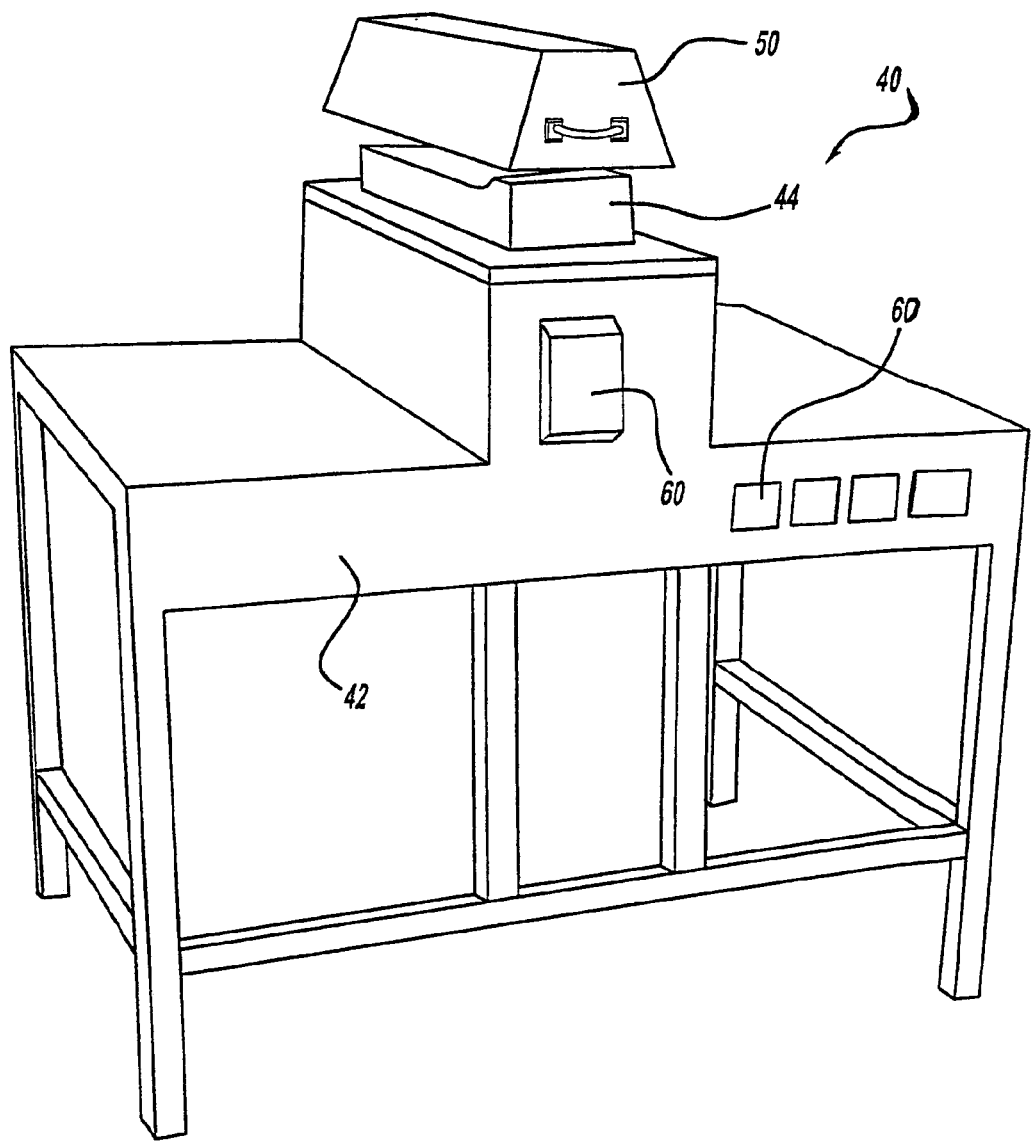
FIG. 7 shows a perspective view of the reticulation unit according to the present invention.

After the film adhesive 14 is temporarily adhered to the perforated panel 10 in the adhesion unit 22 steps two of the reticulation system is begun. As shown in FIGS. 4 and 7 step two includes putting the perforated panel 10, having the film adhesive 14 partially adhered thereto, into a reticulation unit 40. The reticulation unit 40 includes a table 42. The table 42 has a cast or formed rubber contoured head 44 located on a top surface of the table 42. The cast or formed rubber contoured head 44 is interchangeable and is contoured such that it will match the surface of the perforated panel 10. The contour head or plate 44 in one embodiment is made of a rubber material. However, it should be noted any other castable or formable plastic, composite or metal material maybe used for the cast contoured head or plate 44. It should also be noted that the contoured head or plate 44 is interchangeable such that the plate can be removed from the table 42 and a new contour head 44 replaced therein thus allowing for changing of perforated panel 10 parts for the reticulation process. Through a center point of the contoured head is located an air nozzle 46 which will direct an airflow 48 up through the contoured head 44. The contour head 44, which is matched to a particular panel, will help provide a more even distribution of air flow pressure to the panel being processed.

Located directly above and adjacent to the contoured head 44 is a shroud 50. The shroud 50 is preferably made of a metal material. However, it should be noted that any other type of ceramic, plastic or composite material capable of containing heat made also be used for the shroud 50. The shroud 50 also contains a window therein which allows for viewing of the reticulation process. The shroud 50 acts as a containment for heat which will keep the film adhesive 14 warm prior to and during the reticulation process. The shroud 50 provides a greenhouse affect that will keep the air heated properly during the entire reticulation process. The shroud 50 generally has a cup like shaped cross-section. It should be noted that the shroud 50 is capable of movement relative to the contoured head 44, such that in one embodiment approximately a one inch gap will occur between the ends of the shroud 50 and the film adhesive side of the perforated panel 10. It should be noted that the gap could be anywhere from a couple of inches up to a couple of feet depending on the size of the perforated panel 10 being reticulated.

The reticulation unit 40 also includes, as shown in FIGS. 4 and 7, at least one filter and drier mechanism 52. The filter and drier 52 will filter and dry the air that is used to create the airflow 48 for the reticulation process. The filtered and dried air 48 will be moved through a series of tubing 54 to a heating unit 56 by a blower 58. The heating unit 56 will heat the air 48 to a predetermined temperature which in one embodiment is approximately 165° to 175° Fahrenheit. However, it should be noted that any range of temperatures from 60° Fahrenheit up to 400° Fahrenheit maybe used depending on the needs of the airflow 48 for the reticulation process. The heating unit 56 is located below the bottom surface of the table 42. The heating unit 56 is then directly connected to either the bottom of the table 42 or the bottom of the contoured head 44 which includes the nozzle 46 through a center portion thereof. The nozzle 46 will ensure that the airflow 48 has a predetermined width and diameter size. The heated air flow 48 will be directed into a chamber 62 located immediately before the nozzle orifice 46. The air chamber 62 will equalize heat and air flow pressure distribution across the length of the nozzle 46. The airflow 48 will be capable of different pressures due to variables in the blower 58. A control box 60 is also located on or near the table 42 and provides electronic controls for the heat and airflow rate. Therefore, the heat can be programmed and the airflow rate also programmed by the operator of the reticulation unit 40.

In operation the panel and film adhesive reticulation method will, after the film adhesive 14 has been initially applied to the perforated panel 10 in the adhesion unit 22, be completed in the reticulation unit 40 directly after the adhesion unit 22 step or soon thereafter. The perforated panel 10 will be moved in a predetermined direction through the reticulation unit 40. The speed at which the perforated panel 10 is moved through the reticulation unit 40 can vary depending on the amount of reticulation needed and the size and materials of the parts. A material transfer system may be utilized to control the rate of movement of a part through the reticulation system. However, in one embodiment the reticulation unit 40 has each row of orifices 12 in the perforated panel 10 over the air knife or airflow 48 for approximately one second however any other amount of time over the airflow or air knife 48 is also contemplated depending on the design requirements and airflow 48 needed to allow for complete reticulation of the orifices 12 in the perforated panel 10. The nozzle 46 will apply a dried, filtered and heated airflow 48 through the orifices or perforations 12 of the perforated panel 10 from the side of the panel 10 that does not have the film adhesive 14 thereon. It should further be noted that the perforated panel 10 is in contact with or in close proximity and is directly parallel to the nozzle 46. This will allow the airflow 48 to be parallel to the panel orifices 12 at all times thus allowing for a parallel airflow 48 through the orifices 12 of the perforated panel 10. The rate or pressure of airflow 48, the amount of heat and the rate at which the panels 10 move through the unit 40 are all capable of adjustment thus these variables can be changed to accommodate different requirements for different panels in the adhesive system being reticulated. The contoured head 44 is also capable of being designed to different perforated panel shapes and is thus interchangeable as different perforated panels are worked into the reticulation unit 40.

The shroud 50 is located at a predetermined distance from the panel 10 surface side which includes the film adhesive 14, in order to contain the heat and promote a softening of the film adhesive 14 prior to movement through the airflow 48. This will allow the film adhesive 14 to be in a soft easily removable state when it passes over the airflow 48, thus allowing for complete removal of all film adhesive 14 from the orifices 12 of the perforated panel 10. The perforated panel 10 and film adhesive 14 during the time they are under the shroud 50 are maintained at a constant temperature. The shroud 50 creates a more stable environment than radiant heaters used in prior art core reticulation systems. The shroud 50 promotes a greenhouse effect that will re-circulate the heated air to ensure a uniform temperature of the film adhesive 14 under the shroud 50. The perforated panel 10 is pushed through manually over the contoured head 44 such that curvature of the perforated panel 10 will not be a constrain of the reticulation unit 40. It should also be noted that it is contemplated that an automatic method of moving the perforated panel 10 through the reticulation unit 10 can also be used. The use of the airflow 48, having clean dry heated air, directly onto the perforated panel 10 from a very close or direct touching proximity will ensure that no contaminants are present in the airflow 48. Furthermore, the close proximity of the airflow 48 to the bottom of the panel 10 will ensure that any part angularity will not produce turbulence within the orifices 12 which will allow for complete reticulation and opening of the orifices 12 in the perforated panel 10. If the airflow 48 entered the orifices 12 at an angle thereto, a venturi might be developed within the orifice 12 thus keeping the film adhesive 14 from completely clearing away from the orifice 12, and allowing a portion of film adhesive 14 to remain in the orifice 12. This would reduce the acoustic absorption rate of the perforated panel 10. Furthermore, having the airflow 48 directly in contact with the perforated panel 10 will ensure no cooling effect of the airflow 48 before it reaches the film adhesive 14 thus removing the possibility of tearing or ripping of the film adhesive 14 prior to proper removal from the orifice 12 of the perforated panel 10. The adhesion of the film adhesive 14 to the perforated panel 10 instead of the core will allow for a uniform cure between both parts without any orifice 12 blockage between the perforated panel 10 and the core. This will result in significant improvement of acoustic performance thus increasing sound dampening.

Figure 8:
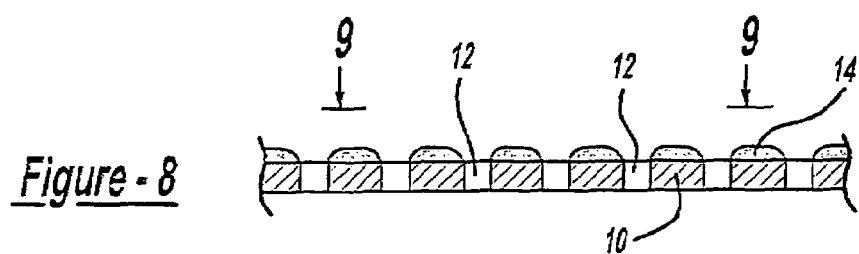
FIG. 8 shows a cross section view of a panel after the reticulation method according to the present invention has been performed.
Figure 9:
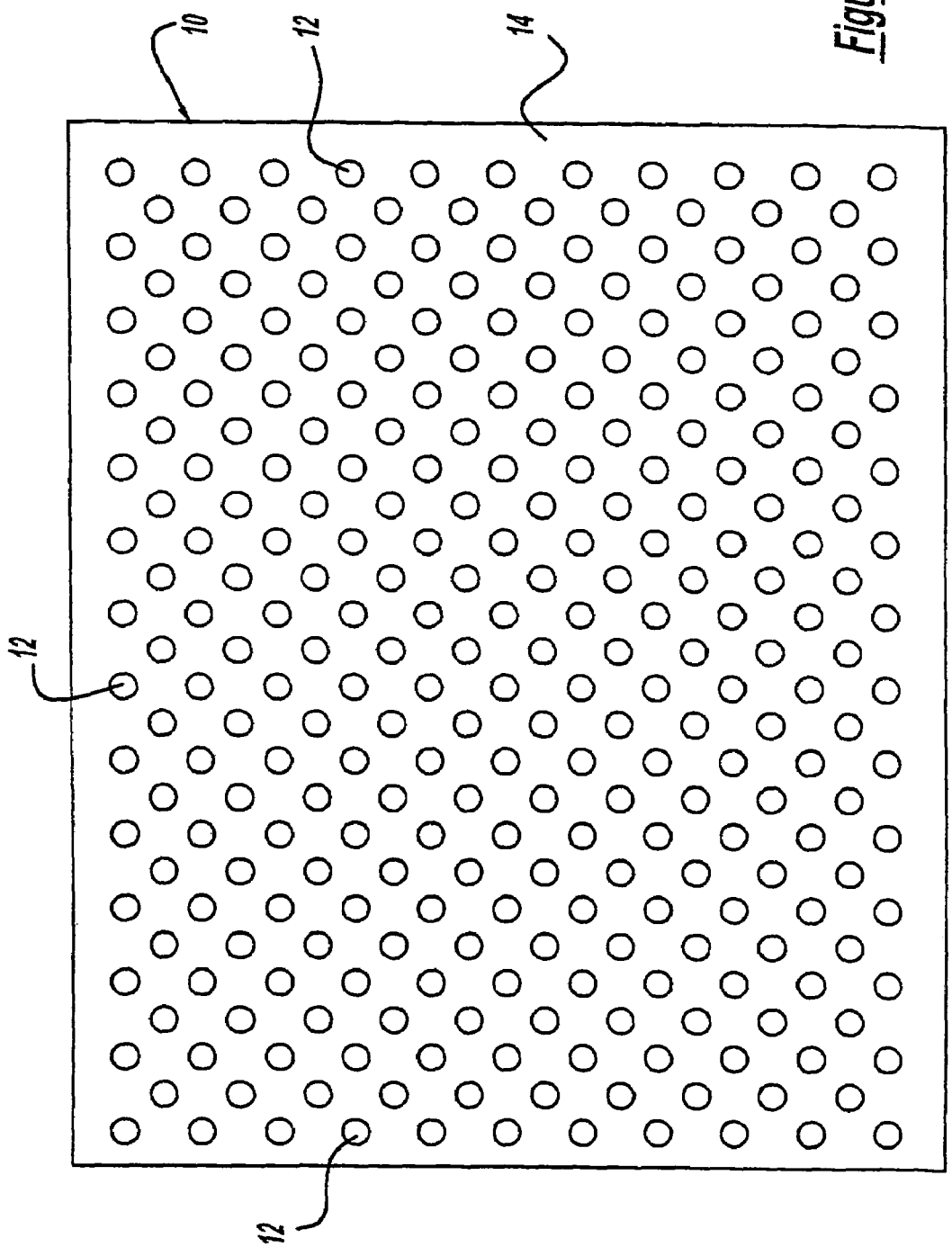
FIG. 9 shows a top view of a perforated panel after the reticulation method according to the present invention has been performed.

FIG. 9 shows a top view of a perforated panel 10 after the panel reticulation process had been completed. FIG. 8 shows a cross-section of such panel 10. The end product panel will exhibit film adhesive 14 uniformly adhered to the perforated panel 10. It should be noted that the film adhesive 14 is uncured at this stage. The perforated panel 10 will have no orifice 12 blockage thus allowing for complete acoustic dampening effect when the perforated panel 10 is finally attached to the honeycomb cell core.

After the panel and film adhesive reticulation process is complete the perforated panel 10 will be aligned with a honeycomb cell core that is already been attached to a like shaped backing material. The perforated panel 10 will be secured to the honeycomb core cell such that curing of the film adhesive 14 occurs and a secure connection is created between the perforated panel 10 and honeycomb core. The honeycomb cells in the core will align with the orifices 12 of the perforated panel 10 thus allowing for the acoustic dampening effects to be included in the acoustic perforated panel. Sound waves will enter through the orifices 12 of the perforated panels 10 and into the honeycomb core structure and be dissipated therein thus dampening any noise being released from with in the containment of the perforated panel acoustic sheet system. It should be noted that the invention has been described for aerospace parts but the panel reticulation system can be used in any other industry where a film adhesive 14 is to be initially set to a panel 10 of any type prior to final curing of the adhesive to a separate part.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention maybe practiced otherwise then as specifically described.

What is claimed is:

1. A method of reticulating a film adhesive onto a perforated panel, said method including the steps of:
    supporting the perforated panel;
    adhering the film adhesive to the perforated panel without initiating a cure of the film adhesive;
    applying a vacuum to the film adhesive;
    softening of the film adhesive;
    moving the perforated panel at a predetermined speed through a reticulation unit, said reticulation unit having a contour head with a nozzle therein, said perforated panel in contact with said contour head;
and
    removing the film adhesive from the perforations by an airflow.

2. The method of claim 1 wherein said step of supporting prevents distortion of the panel.

3. The method of claim 1 wherein said step of applying a vacuum to said firm adhesive creates a pressure of approximately 10 to 20 psi between the film adhesive and the panel thus allowing for initial adhesion.

4. The method of claim 1 further including the step of placing said airflow directly on the perforated panel.

5. The method of claim 1 further including the step of filtering said airflow.

6. The method of claim 1 further including the step of heating said airflow.

7. The method of claim 1 wherein said step of softening includes the step of containing heat near the film adhesive by a shroud and creating a greenhouse effect by said shroud.

8. The method of claim 1 wherein said step of removing includes the step of controlling the rate of airflow such that the heated film adhesive is cut away from the perforations and forms a reticulated pattern.

9. The method of claim 1 wherein said step of softening occurs prior to movement of the panel over said airflow.

10. The method of claim 1 wherein said step of adhering further includes the step of heating the film adhesive.

11. The method of claim 10 further including the step of using a radiant heat source for said heating at a temperature between 70° and 200° F. for a predetermined amount of time.

12. A method for panel and film adhesive reticulation, said method including the steps of:
    using a contoured surface to support eh panel;
    applying pressure to the film adhesive and panel by a vacuum mechanism;
    heating the film adhesive until initial adhering of the film adhesive without curing;
    moving the panel, with initial film adhesion, through a reticulation unit, said reticulation unit including a contour head having a nozzle therein for directing an airflow and said reticulation unit having a shroud, the panel in contact with said contour head;
    softening the film adhesive with heat, said heat is contained within said shroud;
    drying said airflow;
    filtering said airflow;
    heating said airflow prior to entering said nozzle; and
    removing said film adhesive from the perforations in the panel with a predetermined rate of said airflow.

* * * * *

UNITED STATES PATENT AND TRADEMARK OFFICE
CERTIFICATE OF CORRECTION

PATENT NO. : 7,141,136 B2 Page 1 of 1
APPLICATION NO. : 10/812585
DATED : November 28, 2006
INVENTOR(S) : McNeely et al.

It is certified that error appears in the above-identified patent and that said Letters Patent is hereby corrected as shown below:

Col. 9, Line 9 - Please delete "with in" and insert -- within -- after "being released from";

Col. 9, Line 38, Claim 1 - Please delete "an" and insert --said -- after "being released from";

Col. 10, Line 25, Claim 12 - Please delete "eh" and insert -- the -- after "contoured surface to support";

Signed and Sealed this

Thirteenth Day of March, 2007

JON W. DUDAS
*Director of the United States Patent and Trademark Office*